L. E. CLAWSON.
RESILIENT TIRE.
APPLICATION FILED MAY 8, 1916.

1,214,137.

Patented Jan. 30, 1917.

WITNESSES:
Charles Rokles
Frances V. Cole

INVENTOR
Leonard E. Clawson
BY Strong & Townsend
ATTORNEYS

UNITED STATES PATENT OFFICE.

LEONARD E. CLAWSON, OF SAN FRANCISCO, CALIFORNIA.

RESILIENT TIRE.

1,214,137.  Specification of Letters Patent.  Patented Jan. 30, 1917.

Application filed May 8, 1916. Serial No. 96,085.

*To all whom it may concern:*

Be it known that I, LEONARD E. CLAWSON, a citizen of the United States, residing in the city and county of San Francisco and State of California, have invented new and useful Improvements in Resilient Tires, of which the following is a specification.

This invention relates to a resilient tire.

One of the objects of the present invention is to provide a resilient tire, particularly adapted for use in connection with automobiles and like vehicles.

It consists of elastic, circular members having the inner parts abutting in the plane of the wheel and having the outer parts diverged to form two parallel treads with a V-shaped intervening channel. Slots or openings are made through the sides extending around the members and elastic lacing cords pass back and forward through the slots and hold the two parts yieldingly together.

Further objects will hereinafter appear.

The invention consists of the parts and the construction and combination of parts as hereinafter more fully described and claimed, having reference to the accompanying drawings in which—

Figure 1:
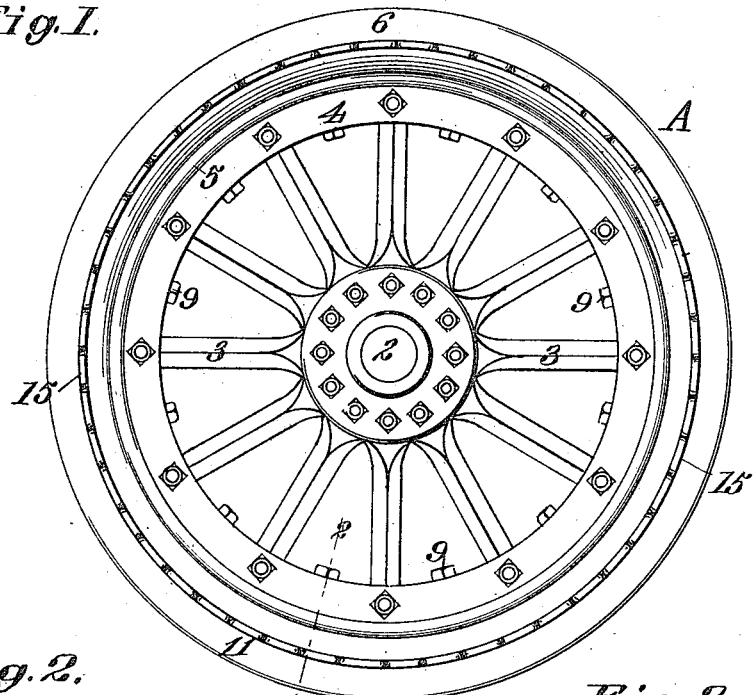
Figure 2:
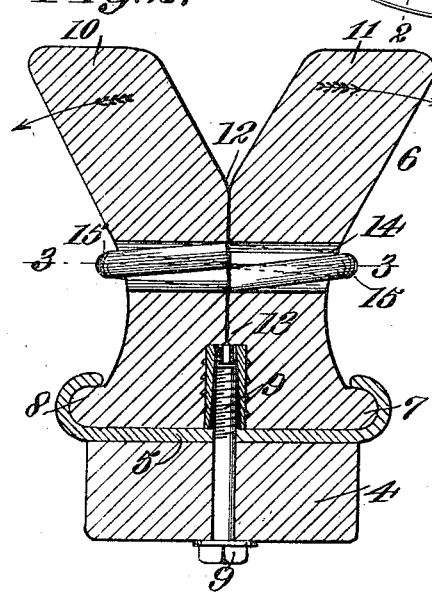
Figure 3:
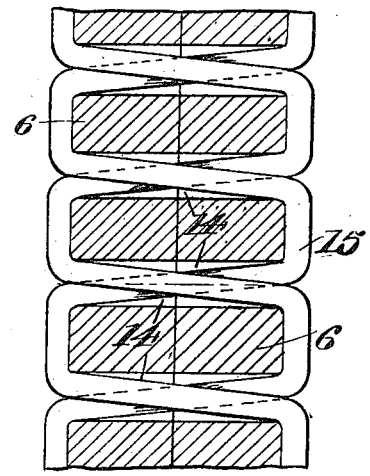

Figure 1 is a side elevation of a wheel, showing the application of the resilient tire. Fig. 2 is an enlarged cross section on line 2—2, Fig. 1. Fig. 3 is a section on line 3—3, Fig. 2.

Referring to the drawings in detail, A indicates in general an ordinary wheel, 2, the hub, 3, the spokes, 4, the felly, 5, a clencher rim, and 6, the tire which forms the subject matter of the present invention.

The tire here shown is composed of two circular abutting members and may be constructed of rubber or other similar material and is adapted to be secured to the clencher rim by annular projecting flanges 7 and 8, fitting the interior curvature of the clenchers.

The outer tread surface of the tire is separated to form a central V-shaped, open groove which terminates at the apex 12, from which the inner surfaces of the split portions contact in a plane which terminates at a point adjacent to the inner ends of the expansion bolts 9, as shown at 13. The outer periphery of the tire thus presents two tread surfaces 10 and 11 with an intermediate groove, the inner or base portion of the two being connected.

Formed in each tire section 10 and 11 intermediate of the annular clenching flanges and the tread surface is a plurality of openings 14, through which an elastic lacing material 15 is passed. This lacing material may consist of round elastic bands, constructed of rubber or other material, laced through the tire sections in the manner illustrated in Fig. 3. Each tread section 10 and 11 is in this manner normally pulled toward the other by the flexible lacing to assume the position shown in Fig. 2, but flexibility in an outward lateral direction to permit the tread members to spread with relation to each other, is permitted when certain loads or obstructions are encountered.

The tire constructed as here shown is simple and compact, cheap to manufacture and may be quickly applied to any standard wheel provided with a clencher rim. The elastic lacing 15 permits the tread sections 10 and 11 to spread and yield with relation to each other, thus producing resiliency and greater traction surface than could otherwise be obtained. The elastic lacing applied as here shown, forms another important feature of the invention, as each lacing forms a continuous ring which may stretch throughout its entire length when subjected to external pressure. Comparatively small wear is thus exerted at any one point as all strains are evenly distributed.

The materials and finish of the several parts of the invention may be such as the judgment and experience of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. A tire for wheels comprising two elastic circular members abutting in the plane of the wheel, and transverse elastic lacing cords connecting said members together, and having an elastic action in unison with that of the tire member.

2. A tire for wheels including a pair of elastic members abutting in the plane of the wheel and having transverse perforations, and an elastic lacing cord through the perforations, having elastic movements in unison with those of the tire.

3. A resilient tire for wheels including two circular elastic members abutting in a central plane of the wheel, having transverse perforations concentric with the circumference, and an elastic cord laced through the perforations, said lacing expanding and contracting coincidently with the compressions and expansions of the tire member.

4. A tire for wheels including circular elastic tread members perforated transversely, and an elastic cord laced through said perforations and expanding and contracting in unison with the compressions and expansions of the tread members.

In testimony whereof I have hereunto set my hand in the presence of two subscribing witnesses.

LEONARD E. CLAWSON.

Witnesses:
JOHN H. HERRING,
W. W. HEALEY.

Copies of this patent may be obtained for five cents each, by addressing the "Commissioner of Patents, Washington, D. C."